Patented Dec. 9, 1930

1,784,080

UNITED STATES PATENT OFFICE

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK

METHOD OF MANUFACTURING ELECTRICALLY-WELDED VESSELS

No Drawing.  Application filed April 18, 1929.  Serial No. 356,073.

This invention relates to the manufacture of electrically welded vessels and is particularly applicable to the manufacture of pressure vessels for the oil cracking industries such as disclosed in Patent No. 1,655,930, to W. F. Woolard.

The object of the invention is to provide a method of manufacturing such vessels which will prevent the setting up of excessive stresses during the fabrication of the vessel, and which will substantially relieve the stresses that may have been set up therein, without deforming the vessel.

In the manufacture of such vessels, it has been found advisable to heat the flat metal plates employed to facilitate the forming of the same and to prevent the possible setting up of excessive stresses in the metal by the forming operation. This is preferably done by heating the plates to an annealing temperature such as 1550° F. and rolling or forming the same while heated. In this way a minimum amount of stresses are set up in the metal by the forming operation and there is less danger of setting up breaking stresses therein by the welding operation, due to the fact that the metal is softened and made workable by the heating and annealing thereof. Furthermore the annealing operation refines the metal and greatly improves the quality thereof.

As disclosed in said patent, the plates may be rolled or formed into rings and the ends of the plates are electrically welded together to close the rings. The electric welding of the longitudinal seam sets up certain stresses which tend to deform the ring. It has heretofore been found advisable to re-roll the ring to restore its circular contour prior to further fabricating operations. The metal is preferably heated to about 1200° F. for the re-rolling operation since that temperature is sufficient to prevent the setting up of any major stresses in the metal by the re-rolling operation and to relieve the stresses set up by the welding operation.

The rings are then welded end to end to provide an integral tubular structure and heads are welded to the end of the structure to complete the closure. The welding of the circumferential seams sets up stresses which are often near the breaking point of the metal. In order to relieve these stresses and to produce a vessel of uniform strength, the entire vessel is then heated to from 900° to 1200° F. and allowed to cool slowly to about 800° F. and then allowed to cool in any suitable manner. In some cases it may be advisable to heat the plates or vessel intermediate the welding thereof in order to prevent the setting up of stresses too near to the breaking point of the metal.

The relieving of the stresses depends upon the temperature and time of the heating and where 1200° F. is employed the time required is much shorter than where only 900° F. is employed. With excessively thick metal, the time and temperature required is much greater than with thin metal since the stresses set up in the thick metal are many times greater. With thicker metal, the temperature employed may be higher without danger of deforming the vessel.

If the vessel were annealed or heated to an annealing temperature such as 1550° F., the same would have a tendency to become deformed due to the weight and increased plasticity of the metal. This feature is particularly important in the manufacture of large cracking vessels since accurate dimensions are desired and it is very difficult to support the vessel during the heating thereof in a manner to prevent its deformation. By heating the vessel to approximately 1200° F. for a suitable time the metal is not rendered sufficiently plastic to cause its deformation and still the stresses which may have been set up therein during the fabrication of the vessel are sufficiently relieved to provide a satisfactory product.

I claim:

The method of manufacturing electrically welded thick walled pressure vessels which comprises annealing the metal plates from which the vessel is to be made, rolling said plates into rings during said annealing operation while the metal thereof is in a heated softened condition, electrically welding the longitudinal meeting edges of each ring plate, heating said welded rings to an annealing temperature reforming the same to true the circular dimensions thereof, electrically welding said rings end to end to form an integral tubular structure, closing the end of said structure, and finally heating said closed structure to a temperature sufficient to substantially relieve the stresses set up therein during the forming and welding operation but insufficient to cause deformation of the structure.

In testimony whereof I have signed my name at Milwaukee, Wisconsin, this 16th day of April, 1929.

RICHARD STRESAU.